United States Patent
Brooks

[19]

[11] Patent Number: 5,584,661
[45] Date of Patent: Dec. 17, 1996

[54] FORWARD SWEEP, LOW NOISE ROTOR BLADE

[75] Inventor: Thomas F. Brooks, Seaford, Va.

[73] Assignee: The United States of America as represented by the Administrator of the National Aeronautics and Space Administration, Washington, D.C.

[21] Appl. No.: 498,807

[22] Filed: Jul. 6, 1995

Related U.S. Application Data

[63] Continuation-in-part of Ser. No. 238,044, May 2, 1994, abandoned.

[51] Int. Cl.⁶ .................................................. B64C 27/467
[52] U.S. Cl. .......................................... 416/238; 416/242
[58] Field of Search .................................. 416/235, 237, 416/238, 228, 242

[56] References Cited

U.S. PATENT DOCUMENTS

| | | | |
|---|---|---|---|
| 1,146,121 | 7/1915 | Amnelius | 416/238 |
| 1,692,081 | 11/1928 | De La Cierva | 416/237 |
| 2,128,780 | 8/1938 | Leff | 416/237 |
| 3,972,646 | 8/1976 | Brown et al. | 416/228 |
| 4,168,939 | 9/1979 | Schmitz et al. | 416/238 |
| 4,684,324 | 8/1987 | Perosino | 416/238 |

FOREIGN PATENT DOCUMENTS

| 924429 | 4/1982 | U.S.S.R. | 416/237 |
|---|---|---|---|

*Primary Examiner*—James Larson
*Attorney, Agent, or Firm*—Kimberly A. Chasteen

[57] ABSTRACT

A forward-swept, low-noise rotor blade includes an inboard section, an aft-swept section and a forward-swept outboard section. The rotor blade reduces the noise of rotorcraft, including both standard helicopters and advanced systems such as tiltrotors. The primary noise reduction feature is the forward sweep of the planform over a large portion of the outer blade radius. The rotor blade also includes an aft-swept section. The purpose of the aft-swept region is to provide a partial balance to pitching moments produced by the outboard forward-swept portion of the blade. The rotor blade has a constant chord width; or has a chord width which decreases linearly along the entire blade span; or combines constant and decreasing chord widths, wherein the blade is of constant chord width from the blade root to a certain location on the rotor blade, then decreases linearly to the blade tip thereafter. The noise source showing maximum noise reduction is blade-vortex interaction (BVI) noise. Also reduced are thickness, noise, high speed impulsive noise, cabin vibration and loading noise.

24 Claims, 4 Drawing Sheets

FORWARD SWEEP, LOW NOISE ROTOR BLADE

ORIGIN OF THE INVENTION

The invention described herein was made by an employee of the United States Government and may be manufactured and used by or for the Government for governmental purposes without the payment of any royalties thereon or therefor.

This is a continuation-in-part application for patent application Ser. No. 08/238,044, filed May 2, 1994, now abandoned.

BACKGROUND OF THE INVENTION

1. Technical Field of the Invention

The present invention relates generally to a helicopter rotor blade and more particularly to a forward sweep, low noise rotor blade.

2. Discussion of the Related Art

Blade-vortex interaction (BVI) noise is one of the most objectionable sources of helicopter noise. This impulsive blade-slap noise can be particularly intense during low-speed landing approach and maneuvers. Over the years, a number of flight and model rotor tests have examined blade tip modification and other blade design changes to reduce this noise.

Impulsive rotor noise is generally caused by localized aerodynamic events on the blade. At high advancing tip speeds, it is due to the presence of transonic flow and associated shocks about the blade tip region. For this, blade tip speed and thickness effects are the most important parameters in defining the noise mechanism and thus its control. At lower speeds, where BVI noise dominates, the number of important parameters increases because the complexity of the rotor wake and its embedded tip vortices becomes central to the problem.

The important interactions on the advancing side of the rotor occur in the first quadrant (between azimuth angles of $\psi=0$ to 90 deg.) where blades interact with tip vortices which were shed upstream. The resulting BVI noise is most strongly directed upstream on the advancing side below the rotor. Strong BVI can also occur on the retreating side in the fourth quadrant, with noise directed below and downstream of the rotor. The local parameters which govern the intensity and directivity of BVI noise include the strength and core size of the tip vortex at the time of interaction, the interaction geometry (angles and "miss distances") of the blade and vortex and the interaction Mach numbers. Of course, in turn, these parameters are determined by operational requirements, such as rotor thrust and flight conditions, and design parameters, such as rotor speed, number of blades, and blade section (i.e. chord width), plan form, twist and tip shape.

One early BVI noise reduction approach taken was to modify the blade tip vortex structure by tip shape design changes. While this approach was unsuccessful, general lessons learned through theoretical and experimental work were used to improve the blade designs. The newer design rotors were generally four-bladed with lower tip speed, thinner blade sections and swept tips. The effect was to decrease thickness and high speed impulsive noises and, to a lesser extent, the BVI noise. Much of the progress in recent years has been in areas other than blade design. For example, flight operation procedures, such as changes in landing speed and descent rate for fixed glide slope approach, were found to reduce main rotor impulsive noise levels some 2 to 5 dB. Rotor tip speed reduction was used successfully on a light helicopter to reduce noise 3 to 4 dB by reducing rotor speed to 90 percent of standard rpm. Another method employed higher harmonic control (HHC) of blade pitch to reduce BVI noise. Results have shown up to 6 dB BVI noise reduction depending on operating condition and control phase. Although the progress of these studies is impressive, the operational and active control methods may be difficult to apply in practice. Also, for many rotorcraft, they may be less effective than passive blade and tip design changes.

It is accordingly an object of the present invention to provide a rotor blade which reduces rotorcraft noise.

It is a further object of the present invention to provide a rotor blade which reduces blade-vortex interaction (BVI) noise.

It is a further object of the present invention to provide a rotor blade which reduces BVI noise in a passive manner.

It is a further object of the present invention to provide a rotor blade which is applicable to standard helicopters and tiltrotors.

It is yet another object of the present invention to accomplish the foregoing objects in a simple manner.

Additional objects and advantages of the present invention are apparent from the drawing and specification that follow.

SUMMARY OF THE INVENTION

A rotor blade is described which includes a straight inboard section, a forward-swept outboard section and an aft-swept section located between the straight inboard section and the forward-swept outboard section. The forward-swept outboard section measures between about 20% and 55% of the span of the rotor blade, and preferably measures 30% of the span of the rotor blade. The forward-sweep angle of the outboard section is between about 25° and 45°, preferably, 35°. The inboard section measures between about 25% and 50% of the span of the rotor blade, and preferably measures 45% of the span of the rotor blade. The aft-swept section measures between about 15% and 40% of the span of the rotor blade, and preferably measures 25% of the span of the rotor blade. The aft-sweep angle of the aft-swept section is between about 15° and 40°, preferably, 20°. The preferred rotor blade embodiment has a constant chord width along the entire blade length. Alternate rotor blade embodiments include a chord width which decreases linearly from the blade root to the blade tip; or a rotor blade wherein the chord width is constant in the straight inboard section then decreases linearly in the aft-swept and forward swept sections to the blade tip thereafter; or a rotor blade wherein the chord width is constant in the straight inboard and aft-swept sections then decreases linearly in the forward-swept section to the blade tip thereafter.

DETAILED DESCRIPTION OF THE INVENTION

Figure 1:
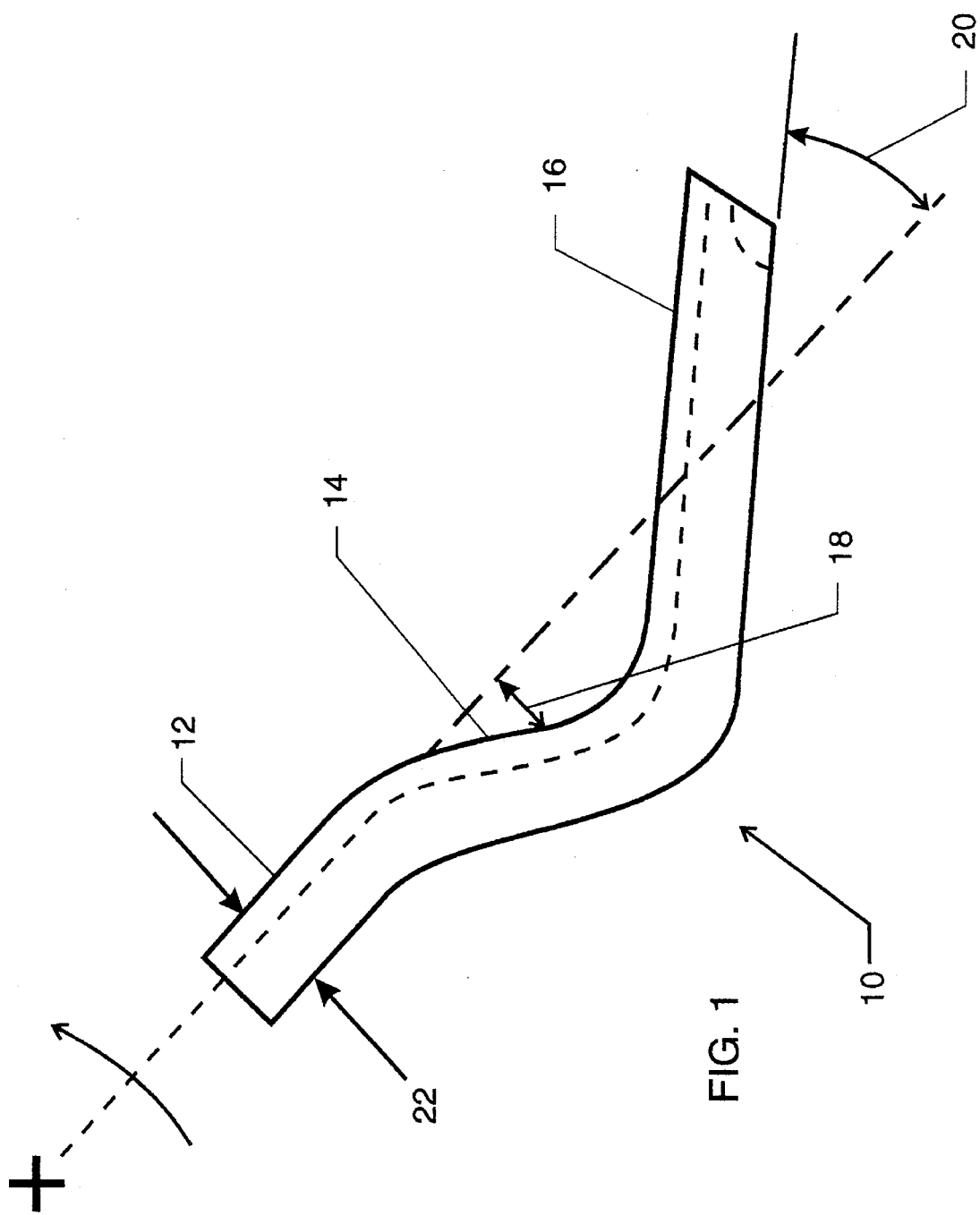
FIG. 1 is a top view of the rotor blade.

FIG. 1 shows a rotor blade 10 of constant chord width 22 having an inboard section 12, an aft-swept section 14 and an outboard forward-swept section 16. In a preferred embodiment, the inboard section 12 measures 45% of the span of the blade 10, the aft-swept section 14 measures 25% of the span of the blade 10 and the forward-swept section 16 measures 30% of the span of the blade 10. The span of the blade 10 refers to the distance between the center of the rotor hub, upon which the blade is mounted, and the blade tip. The aft-swept section 14 is swept back from the inboard section 12 at an angle 18 of 20°. The forward swept section 16 is swept forward from the inboard section 12 at an angle 20 of 35°.

Figure 2:
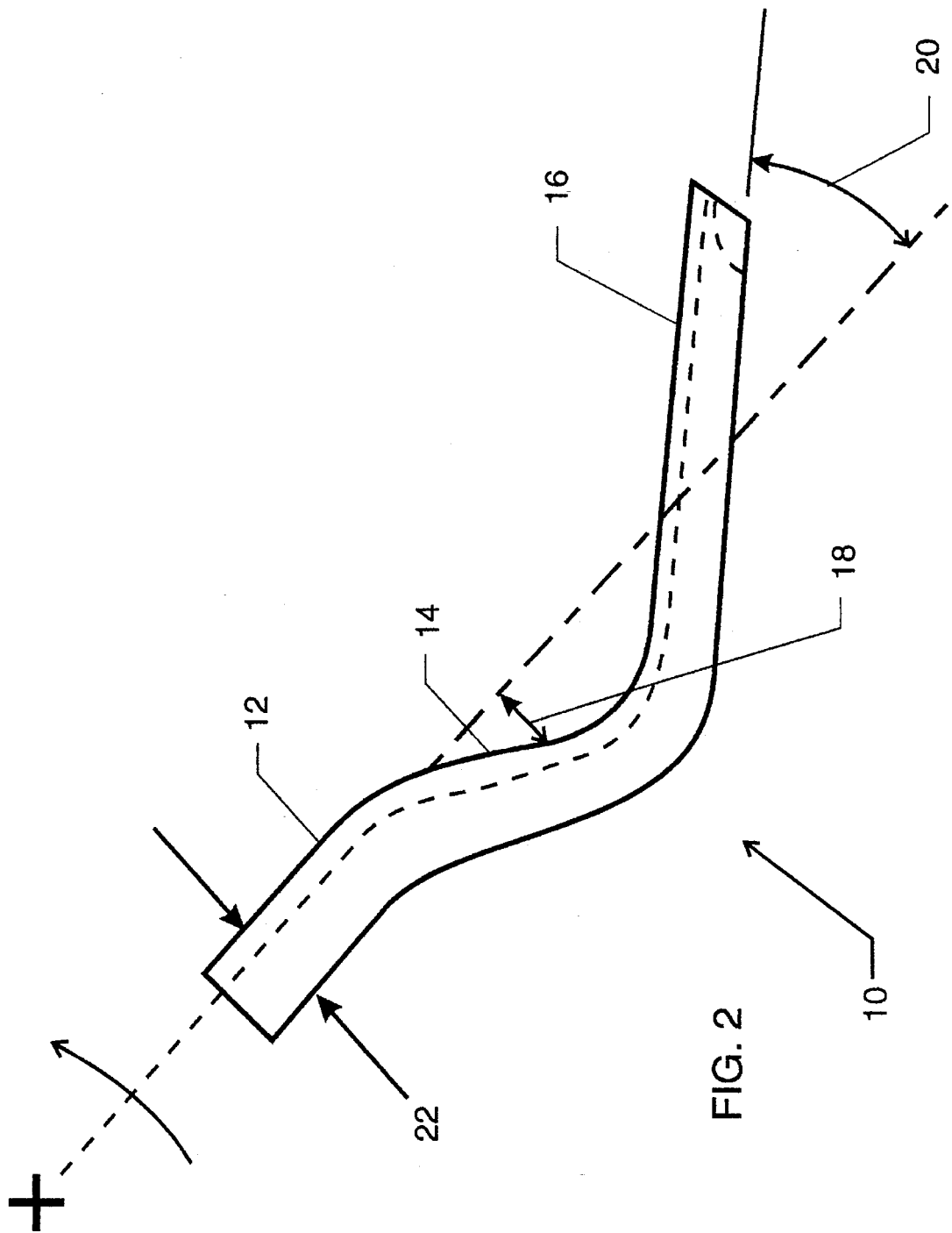
FIG. 2 is a top view of a rotor blade with decreasing chord width.
Figure 3:
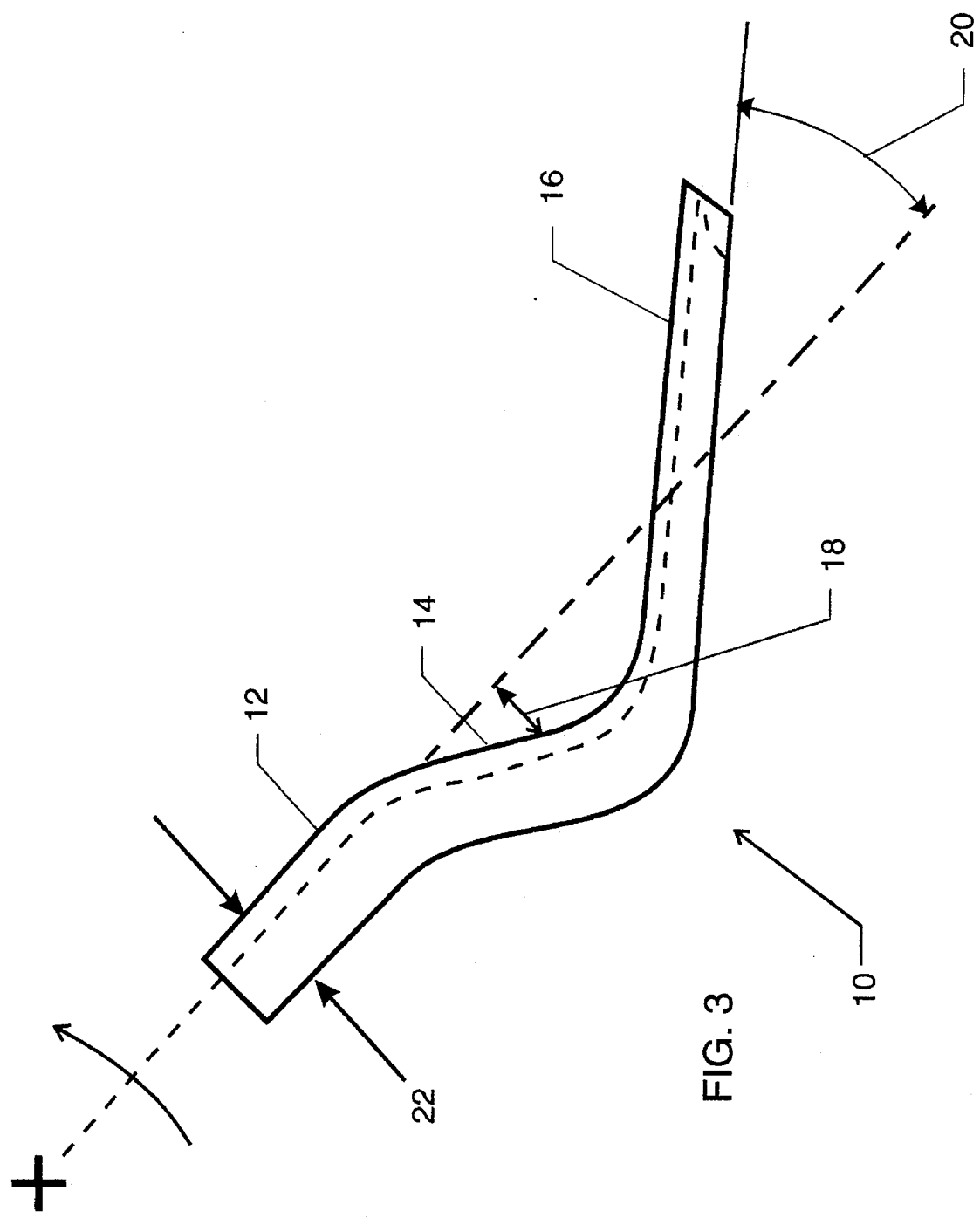
FIG. 3 is a top view of a rotor blade with decreasing chord width along the outermost section.
Figure 4:
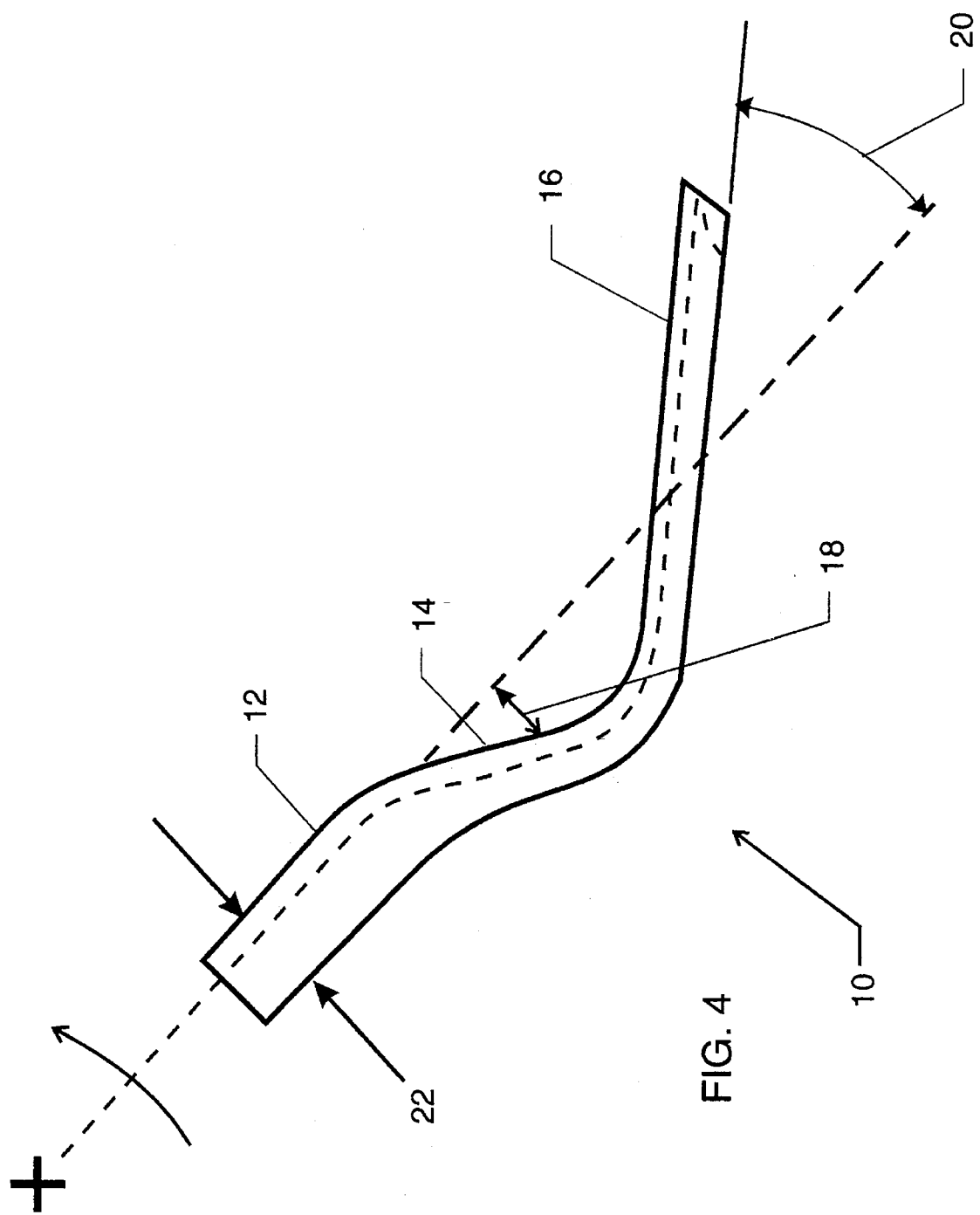
FIG. 4 is a top view of a rotor blade with decreasing chord width along the outermost two sections.

Alternate embodiments include a rotor blade 10 of chord width 22 wherein the chord width 22 decreases linearly between the blade root and the blade tip (see FIG. 2); a rotor blade 10 wherein the chord width 22 is constant in the straight inboard section 12 and the aft-swept section 14 which then decreases linearly in the forward-swept section 16 to the blade tip (see FIG. 3); or a rotor blade of constant chord width 22 in the straight inboard section 12 which then decreases linearly in the aft-swept section and forward-swept section 16 to the blade tip (see FIG. 4).

The actual dimensions of the straight inboard section 12 and the aft-swept section 14 are dependent on aerodynamic and aeroelastic calculations after establishing the spanwise extent and sweep angle 20 of the forward swept section 16. Aerodynamically, the design should set the location of the effective lift center to be close to the blade pitch axis to minimize the control loads. The lift from the aft-swept section 14 and that portion of the forward-swept section 16 which is located aft of the ¼ chord projection line should nominally balance with the outboard forward blade portion. Iterations with standard aeroelastic calculations are then required to establish structural design details.

The purpose of this rotor blade is to reduce the noise of rotor craft, including both standard helicopters and advanced systems such as tiltrotors. The primary noise reduction feature is the forward sweep of the platform over a large portion of the outer blade radius. The purpose of the aft-swept region is to provide a partial balance to pitching moments produced by the outboard forward-swept portion of the blade. The aft-swept section permits both an aerodynamic and dynamic force balance for the blade along the ¼ chord line, and its projection, of the straight inboard section. This allows hub-hinge forces and moments to remain within practical bounds. The aft-swept section also provides the stabilizing blade forces and moments to counteract any forward-sweep-dependant instability which occurs during the blade's rotation. The noise source showing maximum noise reduction is BVI noise, as the forward-swept section intercepts the advancing side tip vortices at skew angles to the blade rather than at near parallel angles, causing the BVI occurrences to lose much of their impulsive character, thus reducing noise. High speed thickness noise is also significantly reduced due to favorable surface thickness gradients for this planform. Compressive noise sources are reduced and high advance ratio performance is improved over standard plan forms due to the "forward-sweep" relief of the tip region compressive effect. The forward sweep maintains this benefit into the forward rotor quadrant on the advancing side and does not suffer from an unsweeping effect which may occur for swept back designs due to locally parallel vortex orientations in that quadrant. Cabin vibration and loading noise are reduced due to a "load averaging" effect of the double sweep planform.

Although my invention has been illustrated and described with reference to the preferred and alternate embodiments thereof, I wish to have it understood that it is in no way limited to the details of such embodiment, but is capable of numerous modifications for many mechanisms, and is capable of numerous modifications within the scope of the appended claims.

I claim:

1. A rotor blade, comprising:

a straight inboard section of constant chord width, a forward-swept outboard section having the same chord width as the straight inboard section; and an aft-swept section located between the straight inboard section and the forward-swept outboard section having the same chord width as the straight inboard section and the forward-swept outboard section.

2. The rotor blade according to claim 1, wherein the forward-swept outboard section comprises between about 20% and 55% of the span of the rotor blade.

3. The rotor blade according to claim 1, wherein the forward-swept outboard section is swept forward between about 25° and 45°.

4. The rotor blade according to claim 1, wherein the inboard section comprises between about 25% and 50% of the span of the rotor blade.

5. The rotor blade according to claim 1, wherein the aft-swept section comprises between about 15% and 40% of the span of the rotor blade.

6. The rotor blade according to claim 1, wherein the aft-swept section is swept back between about 15° and 40°.

7. A rotor blade, comprising:

a straight inboard section of constant chord width;

a forward-swept outboard section, wherein the chord width decreases linearly along the entire length of the forward-swept section; and an aft-swept section located between the straight inboard section and the forward-swept outboard section having the same chord width as the straight inboard section.

8. The rotor blade according to claim 7, wherein the forward-swept outboard section comprises between about 20% and 55% of the span of the rotor blade.

9. The rotor blade according to claim 7, wherein the forward-swept outboard section is swept forward between about 25° and 45°.

10. The rotor blade according to claim 7, wherein the inboard section comprises between about 25% and 50% of the span of the rotor blade.

11. The rotor blade according to claim 7, wherein the aft-swept section comprises between about 15% and 40% of the span of the rotor blade.

12. The rotor blade according to claim 7, wherein the aft-swept section is swept back between about 15° and 40°.

13. A rotor blade, comprising:

a straight inboard section of constant chord width;

a forward-swept outboard section; and an aft-swept section located between the straight inboard section and the forward-swept outboard section, wherein the chord width decreases linearly along the entire lengths of the aft-swept and forward-swept sections.

14. The rotor blade according to claim 13, wherein the forward-swept outboard section comprises between about 20% and 55% of the span of the rotor blade.

15. The rotor blade according to claim 13, wherein the forward-swept outboard section is swept forward between about 25° and 45°.

16. The rotor blade according to claim 13, wherein the inboard section comprises between about 25% and 50% of the span of the rotor blade.

17. The rotor blade according to claim 13, wherein the aft-swept section comprises between about 15% and 40% of the span of the rotor blade.

18. The rotor blade according to claim 13, wherein the aft-swept section is swept back between about 15° and 40°.

19. A rotor blade, comprising:
   a straight inboard section;
   a forward-swept outboard section; and
   an aft-swept section located between the straight inboard section and the forward-swept outboard section, wherein the chord width decreases linearly along the entire length of the rotor blade.

20. The rotor blade according to claim 19, wherein the forward-swept outboard section comprises between about 20% and 55% of the span of the rotor blade.

21. The rotor blade according to claim 19, wherein the forward-swept outboard section is swept forward between about 25° and 45°.

22. The rotor blade according to claim 19, wherein the inboard section comprises between about 25% and 50% of the span of the rotor blade.

23. The rotor blade according to claim 19, wherein the aft-swept section comprises between about 15% and 40% of the span of the rotor blade.

24. The rotor blade according to claim 19, wherein the aft-swept section is swept back between about 15° and 40°.

* * * * *